US011928559B2

(12) United States Patent
Wu et al.

(10) Patent No.: US 11,928,559 B2
(45) Date of Patent: Mar. 12, 2024

(54) TRANSFORMATION FOR MACHINE LEARNING PRE-PROCESSING

(71) Applicant: Google LLC, Mountain View, CA (US)

(72) Inventors: Jiaxun Wu, Sammamish, WA (US); Amir H. Hormati, Kirkland, WA (US)

(73) Assignee: Google LLC, Mountain View, CA (US)

( * ) Notice: Subject to any disclaimer, the term of this patent is extended or adjusted under 35 U.S.C. 154(b) by 473 days.

(21) Appl. No.: 16/843,419

(22) Filed: Apr. 8, 2020

(65) Prior Publication Data

US 2020/0320436 A1 Oct. 8, 2020

Related U.S. Application Data

(60) Provisional application No. 62/830,825, filed on Apr. 8, 2019.

(51) Int. Cl.
| | |
|---|---|
| *G06F 16/00* | (2019.01) |
| *G06F 16/242* | (2019.01) |
| *G06F 16/25* | (2019.01) |
| *G06N 5/04* | (2023.01) |
| *G06N 20/00* | (2019.01) |

(52) U.S. Cl.
CPC ......... *G06N 20/00* (2019.01); *G06F 16/2433* (2019.01); *G06F 16/258* (2019.01); *G06N 5/04* (2013.01)

(58) Field of Classification Search
None
See application file for complete search history.

(56) References Cited

U.S. PATENT DOCUMENTS

| | | | | |
|---|---|---|---|---|
| 9,672,474 | B2 * | 6/2017 | Dirac | G06N 20/00 |
| 10,529,078 | B2 * | 1/2020 | Abreu | G06T 7/75 |
| 11,210,140 | B1 * | 12/2021 | Gold | G06N 20/00 |
| 11,537,606 | B2 * | 12/2022 | Wang | G06F 16/2445 |
| 2015/0379072 | A1 * | 12/2015 | Dirac | G06N 20/00 |
| | | | | 707/693 |

(Continued)

FOREIGN PATENT DOCUMENTS

| | | | |
|---|---|---|---|
| CN | 111611239 A | * 9/2020 | |
| CN | 112380243 B | * 11/2021 | ......... G06F 16/2433 |

(Continued)

OTHER PUBLICATIONS

Data Lifecycle Challenges in Production Machine Learning: A Survey, Polyzotis et al., (Year: 2018).*

*Primary Examiner* — Jean M Corrielus
(74) *Attorney, Agent, or Firm* — Lerner David LLP

(57) ABSTRACT

Methods, systems, and apparatus, including computer programs encoded on a computer storage medium, for transformation for machine learning pre-processing. In some implementations, an instruction to create a model is obtained. A determination is made whether the instruction specifies a transform. In response to determining that the instruction specifies a transform, a determination is made as to whether the transform requires statistics on the training data. The training data is accessed. In response to determining that the transform requires statistics on the training data, transformed training data is generated from both the training data and the statistics. A model is generated with the transformed training data. A representation of the transform and the statistics is stored as metadata for the model.

17 Claims, 5 Drawing Sheets

(56) References Cited

U.S. PATENT DOCUMENTS

| | | | | |
|---|---|---|---|---|
| 2015/0379426 A1* | 12/2015 | Steele | ............... | G06N 5/025 |
| | | | | 706/12 |
| 2015/0379427 A1* | 12/2015 | Dirac | ............... | G06N 20/00 |
| | | | | 706/12 |
| 2015/0379428 A1* | 12/2015 | Dirac | ............... | G06N 20/00 |
| | | | | 706/12 |
| 2015/0379429 A1* | 12/2015 | Lee | ............... | G09B 5/00 |
| | | | | 706/11 |
| 2015/0379430 A1* | 12/2015 | Dirac | ............... | G06N 20/00 |
| | | | | 706/12 |
| 2016/0078361 A1* | 3/2016 | Brueckner | ............... | H04L 67/10 |
| | | | | 706/12 |
| 2017/0293951 A1* | 10/2017 | Nolan | ............... | G06Q 30/04 |
| 2018/0046926 A1* | 2/2018 | Achin | ............... | G06N 20/20 |
| 2018/0240024 A1* | 8/2018 | Huang | ............... | G06F 16/2433 |
| 2018/0357565 A1* | 12/2018 | Syed | ............... | G06N 20/10 |
| 2019/0087475 A1* | 3/2019 | Nagey | ............... | G06N 20/00 |
| 2020/0257992 A1* | 8/2020 | Achin | ............... | G06N 20/10 |
| 2021/0398012 A1* | 12/2021 | Novotny | ............... | G06F 16/2465 |
| 2022/0215034 A1* | 7/2022 | Park | ............... | G06N 20/00 |
| 2022/0245518 A1* | 8/2022 | Ishii | ............... | G06F 16/285 |
| 2023/0169074 A1* | 6/2023 | Kim | ............... | G06F 16/24522 |
| | | | | 704/9 |

FOREIGN PATENT DOCUMENTS

CN 114547072 A * 5/2022
WO WO-2023274213 A1 * 1/2023

* cited by examiner

TRANSFORMATION FOR MACHINE LEARNING PRE-PROCESSING

CROSS-REFERENCE TO RELATED APPLICATION

This application claims the benefit of U.S. Application No. 62/830,825, filed Apr. 8, 2019, which is incorporated by reference.

TECHNICAL FIELD

This specification generally relates to machine learning techniques.

BACKGROUND

Machine learning may use training data to train models that can be used to make predictions. Structured Query Language (SQL) was designed to query data, and is now extended to Machine Learning. Users nowadays can train models and make predictions with simple SQL syntax.

SUMMARY

This document describes techniques, methods, systems, and other mechanisms for transformation for machine learning pre-processing in SQL engine. Machine learning users may spend a significant amount of time preprocessing data before training a model. To train a model in SQL, users can already preprocess data with SQL expressions. However, these tools may include several issues in data pre-processing.

One issue may be training prediction skew. Training prediction skew may refer to a difference between performance of a model during training, e.g., when the model is being generated, versus during prediction, e.g., when the model is being used after creation. Users attempting to use a model for predictions may need to know the transformations applied during training and their relevant parameters, e.g. a maximum value from the training data, to pre-process prediction data. A user not knowing a transform applied during training may lead to duplication and also data mismatch during prediction causing training prediction skew. The output of the model could be wrong because of training prediction skew.

Another issue may be a lack of predefined data preprocessing functions built into the SQL engine. There may be no easy way for users to perform some commonly-used feature engineering. For example, users may have to list all possible combinations for polynomial expansion One innovative aspect of the subject matter described in this specification is embodied in methods that include the actions of obtaining an instruction to create a model, determining whether the instruction specifies a transform, in response to determining that the instruction specifies a transform, determining whether the transform requires statistics on the training data, in response to determining that the transform requires statistics on the training data, generating transformed training data from both the training data and the statistics, generating a model with the transformed training data, and storing a representation of the transform and the statistics as metadata for the model.

Although this application is described in the context of SQL, this application is applicable to various types of relational databases including those that may use programming languages other than SQL.

In one general aspect, a method includes: obtaining an instruction to create a model using training data; determining whether the instruction specifies a transform; in response to determining that the instruction specifies the transform, determining whether the transform requires statistics on the training data; accessing the training data; in response to determining that the transform requires statistics on the training data, generating transformed training data from both the training data and the statistics; generating a model with the transformed training data; and storing a representation of the transform and the statistics as metadata for the model.

Implementations may include one or more of the following features. For example, in some implementations, the method includes, in response to determining that the transform requires statistics on the training data, analyzing the training data to obtain the statistics.

In some implementations, the training data includes data entries; and analyzing the training data to obtain the statistics includes using all of the data entries to obtain the statistics.

In some implementations, analyzing the training data to obtain the statistics includes analyzing a portion of the training data identified by the instruction.

In some implementations, generating the transformed training data from both the training data and the statistics includes performing one or more functions on the portion of the training data based on the transform.

In some implementations, determining whether the instruction specifies the transform includes identifying one or more analytic functions of the transform in the instruction, and generating transformed training data from both the training data and the statistics includes converting the one or more analytic functions to one or more scalar functions using the statistics prior to performing the one or more scalar functions on the training data.

In some implementations, the instruction indicates a portion of the training data, and accessing the training data includes accessing the portion of the training data.

In some implementations, the method includes: receiving prediction data; obtaining a model; determining whether metadata for the model includes a transform; in response to determining that the metadata for the model includes the transform, determining that the transform requires statistics on the training data used to train the model; in response to determining that the transform requires statistics on the training data, accessing the statistics from the metadata; generating transformed prediction data based on the transform, the statistics, and the prediction data; and determining a prediction based on the transformed prediction data and the model.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
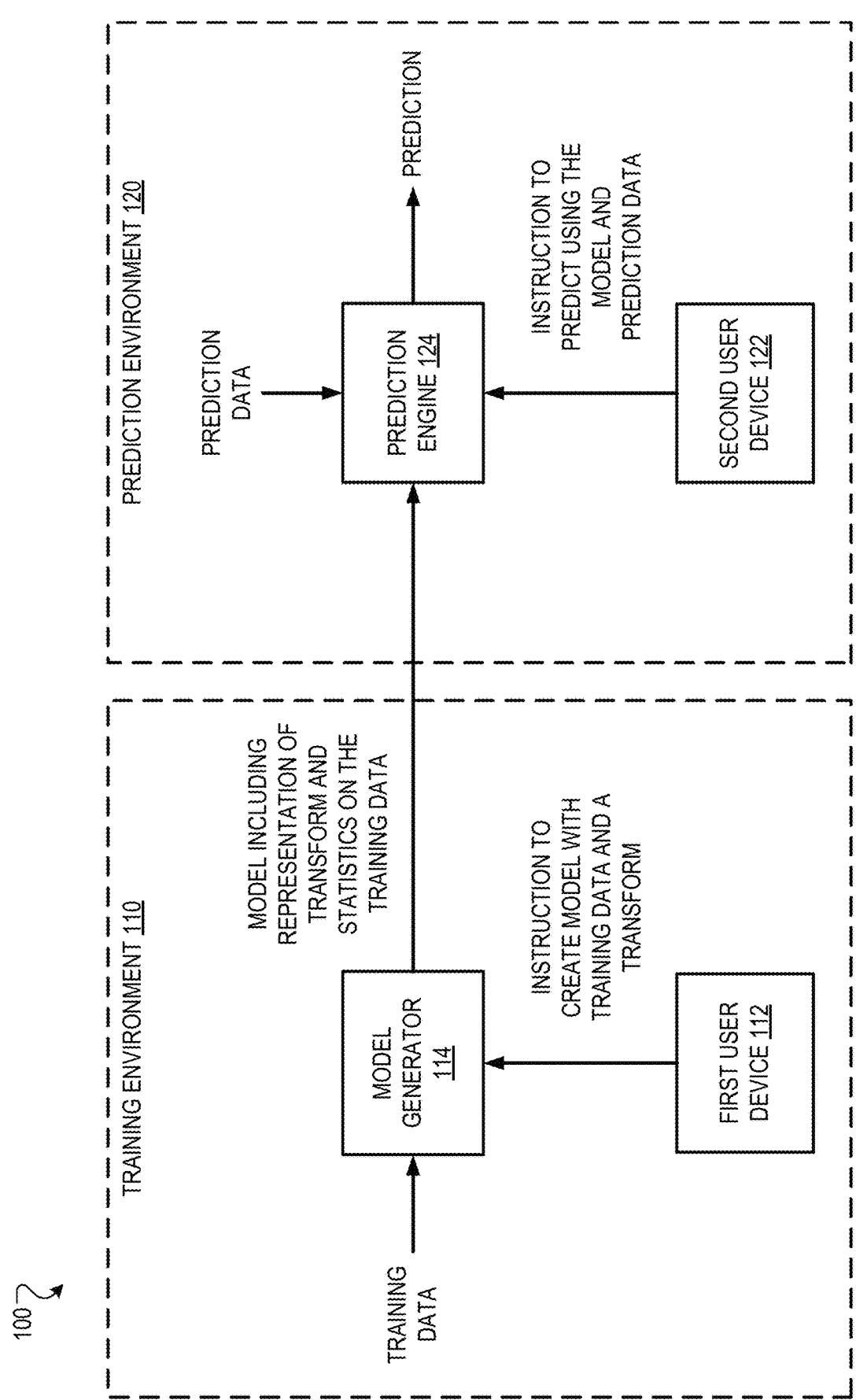
FIG. 1 is a block diagram of an example system that performs transformation for machine learning pre-processing.

FIG. 1 is a block diagram of an example system 100 that performs transformation for machine learning pre-processing. The system may include a training environment 110 and a prediction environment 120. The training environment 110 may be an environment where a model is created. The prediction environment 120 may be an environment where the model that was created is used to make predictions.

The system 100 may be a Structured Query Language (SQL) based system that receives SQL queries from users. For example, the training environment 110 and the prediction environment 120 may both be implemented on one or more SQL engines that handle SQL queries and process data stored in tables. The system 100 may be SQL based in that the system 100 only uses processing that is scalable to large datasets. For example, the system 100 may use only SQL functions that are scalable and not call customized libraries that use non-scaling functions.

The training environment 110 includes a first user device 112 and a model generator 114. The first user device 112 may be a computing device that a user uses to input an instruction that specifies a model is to be created using a set of training data and a transform applied to the training data. For example, a user by type into a desktop computer a SQL query of "CREATE MODEL model_name TRANSFORM (f1+1 AS f1_plus_one, ML.MIN_MAX_SCALER(f2) AS f2_normalized, label) OPTIONS(type='linear_reg') AS SELECT f1, f2, label FROM input_table." The model generator 114 may be SQL based and support all standard SQL queries, as well as SQL queries to create models with machine learning and transformations on training data.

The example query instructs that transformed training data is to be generated by taking data in the table named "input_table," increasing values in a first column of the table by one, and normalizing values in a second column of the table to be between zero and one based on minimum and maximum values in the column, and then the model is to be created by training using the transformed training data. In some implementations, the transformation of the training data may not change the underlying training data itself but may instead create a new set of data that may be discarded after the model is created.

The model generator 114 may be implemented on a server, receive the instruction, obtain training data based on the instruction, and create a model based on the training data and the instruction. For example, using the SQL query above, the model generator 114 may receive an instruction to create a model from training data in a table named "input_table."

In creating the model, the model generator 114 may determine whether the instruction specifies to perform a transform on the training data and then generate the model using the transformed training data. For example, the model generator 114 may determine that the above example SQL query specifies to perform a transform. The model generator 114 may determine whether the instruction specifies to perform a transform based on determining whether the instruction includes a "TRANSFORM" clause. For example, the model generator 114 may determine that the instruction includes "TRANSFORM (f1+1 AS f1_plus_one, ML.MIN_MAX_SCALER(f2) AS f2_normalized, label)" so the instruction does include a transform. In another example, the model generator 114 may determine that the instruction does not include "TRANSFORM("later followed by a")," so the instruction does not include a transform.

If the model generator 114 determines that the instruction includes a transform, the model generator 114 may then determine whether the transform requires statistics on the training data. For example, the model generator 114 may determine that a transform uses a MIN_MAX_SCALAR function which uses values of all rows from the training data to identify minimum and maximum values for a column and, in response, determine that the transform requires statistics. In some implementations, a transform that uses a function that requires statistics on the training data may be referred to as an aggregate function and a transform that does not require statistics on the training data may be referred to as a scalar function.

In some implementations, the model generator 114 may determine whether a transform requires statistics on the training data based on functions used in the transform. For example, each function may be labeled in advance as being an aggregate function or a scalar function and the model generator 114 may determine that a transform requires statistics based on determining that the transform includes at least one function with a label that indicates the function is an aggregate function.

The model generator 114 may then generate transformed training data from the training data by applying the specified transform, including generating any statistics on the training data needed for the transform. For example, where the transform includes "ML.MIN_MAX_SCALER(f2) AS f2_normalized," the model generator 114 may determine statistics that specify a minimum value and a maximum value for that column, and then generate transformed values that range between zero and one based on the minimum, maximum, and non-transformed values.

The model generator 114 may then store a representation of the transformation and the statistics in metadata for the model. For example, the model generator may store the strings "TRANSFORM (f1+1 AS f1_plus_one, ML._INTERNAL_MIN_MAX(f2, min_f2, max_f2) AS f2_normalized, label)," as metadata stored with the model where the strings represent the transform, the minimum value for f2 in the training data (min_f2), and the maximum value for f2 in the training data (max_f2), respectively.

The second user device 122 may be a computing device used by a second user to input an instruction that specifies that a model be used on prediction data to make predictions. For example, the second user device 122 may input the instruction "SELECT*FROM ML.PREDICT(MODEL model_name, (SELECT f1, f2, f3 FROM predict_table))."

As shown in the example, the second user doesn't need to specify the transform to be applied to the prediction data.

The prediction engine 124 may be implemented on a server and may obtain the instruction to make predictions from the second user device 122, obtain the model created by the model generator 114, obtain the prediction data, and output a prediction based on the model and the prediction data. The prediction engine 124 does not need the instruction to include any transform that needs to be applied to the prediction data as the model already includes the transform, and the prediction engine 124 does not need all the training data for transforms as the model also already includes statistics regarding the training data that is needed for transforming the prediction data.

In outputting the prediction, the prediction engine 124 may determine whether to transform the prediction data and then input the transformed prediction data into the model based on whether the model includes a representation of a transform. For example, the prediction engine 124 may determine that the model includes metadata that includes the string "TRANSFORM (f1+1 AS f1_plus_one, ML._INTERNAL_MIN_MAX(f2, min_f2, max_f2) AS f2_normalized, label)" and, in response, determine to transform the prediction data using the transform.

In response to determining to transform the prediction data, the prediction engine 124 may determine whether the transform requires statistics regarding training data. For example, the prediction engine 124 may, similarly to the model generator 114, determine whether the transform includes an aggregate function. In response to determining that the transform requires statistics regarding training data, the prediction engine 124 may then obtain the relevant statistics from the model. For example, the prediction engine 124 may determine that the function ML._INTERNAL_MIN_MAX(f2, min_f2, max_f2) requires minimum and maximum values for a column in the training data, and, in response, obtain the minimum value of 2 and maximum value of 78 from min_f2 and max_f2 in the metadata of the model.

In some implementations, the first user device 112 and the model generator 114 may be implemented by the same computing device. For example, the model generator 114 may execute on the first user device 112. In some implementations, the first user and the second user may be the same user and the first user device 112 and the second user device 122 may be the same device. For example, the same user may use the same computing device to first create a model, and then request predictions using the model. In some implementations, the model generator 114 and the prediction engine 124 may be implemented by the same computing device. For example, the model generator 114 and the prediction engine 124 may both execute on a single server.

As an example, the SQL training syntax can appear as the following code:

```
CREATE [OR REPLACE] [TEMP] MODEL
[IF NOT EXISTS] model_name
    [TRANSFORM (select_list)]
    [OPTIONS ([type = STRING],
        [input_label_cols = ARRAY<STRING>],
        [<parameter> = STRING, ...])]
    AS query_expr
```

The syntax can follow one or more rules. These rules can include, for example, one or more of the following:

Rule 1: When there is no TRANSFORM clause, all columns of the training data in query_expr will be used in training.

Rule 2: The data used in training is "SELECT seLect_List FROM (query_expr)".

Rule 3: "*", "*EXCEPT" and "*REPLACE" all work in select_List.

Rule 4: During prediction, users (e.g., the user of the second user device 122) don't need to specify the transform expression again in the query.

Rule 5: During prediction, the columns used of the training data are matched with training columns (from query_expr) by name. Any missing column, even not used inside TRANSFORM clause, or column type mismatch can cause a user error.

Rule 6: Only the output of the TRANSFORM clause is used for training the model. This can require: (i) if columns in input_Label1_coLs are not output from the TRANSFORM clause, users will receive an error, and in the absence of input_LabeL_coLs, label should be present in the output of TRANSFORM; and (ii) any name conflict in the output of TRANSFORM can cause a user error.

Rule 7: Aggregate functions are not allowed in the seLect_List. For analytic functions, only the built-in machine learning (ML) transform functions are allowed in seLect_List.

Rule 8: Only limited reversible transforms (e.g. log) can be applied to label columns of the training data inside the TRANSFORM clause. The check can be enforced, for example, by GoogleSql, while it's the specific engine's decision to support the label transform or not. If the reversible transform is supported, the prediction output should be reversed. As an example, if ML.LOG (original_label) is supported as a label transform method which converts original_label to log 2(orginal_label), "ML.LOG(orginal_label) AS label" will be allowed. During prediction, the predicted label will be the reverse of ML. LOG, which is 2^(raw_predicted_label).

In general, every transform function can perform one or two actions. First, the transform function can optionally call for the model generator 114 to perform an analysis of all or part of the training data. This analysis can act as an aggregate function over all input rows of the training data, computing one or more aggregated summary objects that will be stored in the model. For example, as is discussed below in more detail with respect to FIG. 3, the model generator 114 can identify the function min_max_scalar(x) in the TRANSFORM clause, determine that an analysis of column x of the training data needs to be performed to determine a maximum and minimum value in column x of the training data, and perform the analysis of the column x of the training data. The model generator 114 can save the results of the analysis, e.g., the statistics, to the model.

Second, the transform function includes a transformation. The transformation acts as a scalar function over one input row of the training data, and can be performed for each row of the training data. For transform functions that compute aggregate summary objects, the summary object from the model is implicitly passed into the function.

A transform function with both an analysis component and a transformation component behaves the same as an analytic function over the entirety of the training data.

In some implementations, there are certain transform functions that do not need any analysis information. For example, the model generator 114 does not need to perform any analysis of the training data for the function polynomial_expand(f1, f2). For these transform functions, the model generator 114 treats the transform functions as normal scalar functions.

Accordingly, there are two types of transform functions: analytic functions and scalar functions. Analytic transform functions include the analysis component. Scalar transform functions only include the transformation itself.

Provided below is example code for training a model (e.g., in the training environment 110) with preprocessed features only:

```
CREATE MODEL model_name
TRANSFORM(
    f1 + 1 AS f1_plus_one,
    CONCAT(f2, f3) AS f2_f3,
    label
)
    OPTIONS(type='linear_reg')
AS SELECT f1, f2, f3, label from Table;
```

At prediction, the user of the second user device 122 does not need to specify the transforms again (e.g., in the prediction environment 120) as depicted in the following example code:

```
SELECT * FROM
    ML.PREDICT(
        MODEL model_name,
        (SELECT f1, f2, f3 FROM predict_table)
    );
```

Provided below is example code for training a model (e.g., in the training environment 110) with special ML transform functions:

```
CREATE_MODEL model_name
TRANSFORM(
    ML.MIN_MAX_SCALER(f1) AS f1_normalized,
    ML.MIN_MAX_SCALER(f2) AS f2_normalized,
    ML.FEATURE_BUCKETIZE(f1, [2, 5, 10]) AS f1_bucketized,
    label
)
    OPTIONS(type='linear_reg')
AS SELECT f1, f2, label FROM input_table;
```

At prediction, the user of the second user device 122 does not need to specify the transforms again (e.g., in the prediction environment 120) as depicted in the following example code:

```
SELECT * FROM
    ML.PREDICT(
        MODEL model_name,
        (SELECT f1, f2 FROM predict_table)
    );
```

Provided below is example code for training a model (e.g., in the training environment 110) with some of the original features and preprocessed features:

```
CREATE MODEL model_name
TRANSFORM(
    ML.FEATURE_BUCKETIZE(f1, [2, 5, 10]) AS f1_bucketized,
    1 / f2 AS f2_inverse,
    f1,
    label
)
    OPTIONS(type='linear_reg')
AS SELECT f1, f2, label FROM input_table;
```

As second example of code for training a model (e.g., in the training environment 110) with some of the original features and preprocessed features is provided below:

```
CREATE MODEL model_name
TRANSFORM(
    ML.FEATURE_BUCKETIZE(f1, [2, 5, 10]) AS f1_bucketized,
    1 / f2 AS f2_inverse,
    * EXCEPT F2
)
    OPTIONS(type='linear_reg')
AS SELECT f1, f2, label FROM input_table;
```

Provided below is example code for training a model (e.g., in the training environment 110) with text embedding feature transform:

```
CREATE MODEL model_name
TRANSFORM(
    ML.TEXT_EMBEDDING(f1, vocab_table) AS f1_transformed,
    label
)
    OPTIONS(type='linear_reg')
AS SELECT f1, label FROM input_table;
```

In this example, "f1" is a string column of the training data with text in it. Additionally, "vocab_table" is a vocabulary table for f1 to join with. The output of the transform function is a scalar output.

Provided below is example code for running (e.g., in the training environment 110) an analytic transform function outside of the TRANSFORM clause:

```
SELECT ML.MIN_MAX(x) OVER( ) FROM input_
    table;
```

In this example, "OVER( )" is required when the function is used outside the TRANSFORM clause and when it is used inside the TRANSFORM clause.

In some implementations, "OVER( )" is not required inside the TRANSFORM clause. When "OVER( )" is included inside the TRANSFORM clause, the model generator 114 can automatically convert the function to a scalar function, e.g., removes "OVER( )".

The transform functions included in the TRANSFORM clause of the instruction to create a model provided by the first user device 112 can include one or more of the following functions:

| Function | Platform | Proposed Function Options |
|---|---|---|
| Numerical Feature Transformations | | |
| Standardize (z score) | TF, sklearn, Spark ML | ml.standardize(col) OVER( ) |
| Bucketize | TF, Spark ML | ml.bucketize(col, num_buckets) OVER( ) |
|  |  | ml.bucketize(col, array<splits>) |
| MinMax | TF, sklearn, Spark ML | ml.min_max(col) OVER( ) |
| PolynomialExpand | sklearn, Spark ML | ml.polynomial_expand(STRUCT(col_1, . . . , col_n)[, degree]) |

| Function | Platform | Proposed Function Options |
|---|---|---|
| Categorical Feature Transformations | | |
| TF-IDF | TF, sklearn, Spark ML | ml.tf_idf(col) OVER( ) |
| compute/apply_vocab | TF | ml.compute_and_apply_vocab(col) OVER( ) |
| | | ml.apply_vocab(col, vocab_table) |
| | | NOTE: vocab_table is a string-int map table |
| n-gram | TF, sklearn, Spark ML | ml.n_gram(col, n) OVER( ) |
| OneHotEncode | Sklearn, Spark ML | ml.one_hot_encode(col) OVER( ) |
| Word2Vec | Spark ML | ml.word2vec(col[, vocab_table]) OVER( ) |
| | | NOTE: vocab_table is a string-vector map table |
| Feature Filtering Transformations | | |
| PCA | Sklearn, Spark ML | ml.pca(STRUCT(col_1, . . . , col_n)) OVER( ) |

In some implementations, the system 100 can use an alternative SQL syntax from that described above. For example, an alternative syntax can specify preprocessing functions in a STRING format. This syntax can provide a benefit in that the transform functions are only available inside the CREATE MODEL SQL statement. Accordingly, users, such as the user of the first user device 112, would not be able to use the transform functions outside of training where they likely do not make sense to use. An example of this syntax during training is provided in the following code:

```
CREATE MODEL model_name
    FEATURE(LANGUAGE proto as "column: 'f2' log{range{min:
    0 max: 1}}")
    FEATURE(LANGUAGE proto as
"column: 'f1' sanitize{algorithm: 'sift'} embedding {tf_hub: '<tfhubid>'}")
    LABEL(SELECT log(label) as label)
    OPTIONS(type='linear_reg')
AS SELECT f1, f2, l1 + l2 as label FROM input_table
```

As an example, another alternative syntax can specify transforms using name-value pairs similar to OPTIONS. This has the benefit of matching the TFX (Google-production-scale machine learning platform) preprocessing syntax. This syntax can also support arbitrary transformations. An example of this syntax during training is provided in the following code:

```
CREATE MODEL model_name
    TRANSFORM (
        bucketization = f1,
        min_max = f2,
        min_max = f3,
        polynomial_expand = ((f6, f7), 3),
        polynomial_expand = STRUCT(STRUCT(f4)),
        exclude_cols = (f1, f2, f3)
    )
    OPTIONS (type = 'linear_reg')
AS SELECT * FROM input_table;
```

In this example, the syntax at prediction can be depicted with the following code:

```
SELECT * FROM
    ML.PREDICT(
        MODEL model_name,
        (
        SELECT f1, f2 FROM predict_table
        )
    );
```

As an example, another alternative syntax can specify preprocessing functions inside the training OPTIONS. This has the benefit of being easy to implement as it does not require changes to existing SQL syntax. An example of this syntax during training is provided in the following code:

```
CREATE MODEL model_name
    OPTIONS(type='linear_reg',
        transformations=STRUCT(transform_type='polynomial_expand',
        features=['f1', 'f2']))
    AS SELECT f1, f2, label FROM input_table;
```

In this example, the syntax at prediction can be depicted with the following code:

```
SELECT * FROM
    ML.PREDICT(
        MODEL model_name,
        (
        SELECT f1, f2 FROM predict_table
        )
    );
```

As an example, another alternative syntax can specify feature transformations as part of the SELECT statement and specify the same transformations during prediction. This has the benefit of being easy to implement as only the scalar functions need to be specified, and it does not require changes to existing SQL syntax. An example of this syntax during training is provided in the following code:

```
CREATE MODEL model_name
    OPTIONS(type='linear_reg')
AS SELECT ML.POLYNOMIAL_EXPAND(f1, f2) AS f1f2, label FROM
input_table;
```

In this example, the syntax at prediction can be depicted with the following code:

```
SELECT * FROM
    ML.PREDICT(
        MODEL model_name,
        (
        SELECT ML.POLYNOMIAL_EXPAND(f1, f2) AS f1f2 FROM
predict_table
        )
    );
```

As an example, another alternative syntax can specify feature transformations as part of the SELECT statement and can automatically apply the same transformations during prediction. This has the benefit of allowing for simplified training and prediction queries, e.g., from the first user device 112 and the second user device 122 respectively. An example of this syntax during training is provided in the following code:

```
CREATE MODEL model_name
  OPTIONS(type='linear_reg')
AS SELECT ML.POLYNOMIAL_EXPAND(f1, f2) AS f1f2, label FROM
input_table;
```

In this example, the syntax at prediction can be depicted with the following code:

```
        SELECT * FROM
          ML.PREDICT(
            MODEL model_name,
            (
            SELECT f1, f2 FROM predict_table
            )
          );
```

In some implementations, a programming language (e.g., protocol buffer language) can be used. For example, the following code can be used to select a different programming language:

```
CREATE [OR REPLACE] [TEMP] MODEL [IF NOT EXISTS] model_
name
  [OPTIONS ([type = STRING],
      [input_label_cols = ARRAY<STRING>],
      [<parameter> = STRING, ...])]
  [TRANSFORM [AS (select_list)] | [LANGUAGE language AS
("""body""")]]
AS query_expr
```

In this example, a user can use select_list or specify another language for the body of the transformations. All the languages, in terms of semantics, should behave similar to the select_list semantics.

Example code showing the selection of a different programming language is provided below:

```
    CREATE MODEL model_name
      OPTIONS(type='linear_reg')
      TRANSFORM LANGUAGE proto AS ("
        column: 'f2' log{range{min: 0 max: 1}}
        column: 'f1' sanitize{ algorithm: 'sift'} embedding {tf_hub:
'<tfhubid>'}
        label: "log { add {column: "I1" column:"I2"}}"
        "''
    AS SELECT f1, f2, I1, I2 FROM input_table
```

Figure 2:
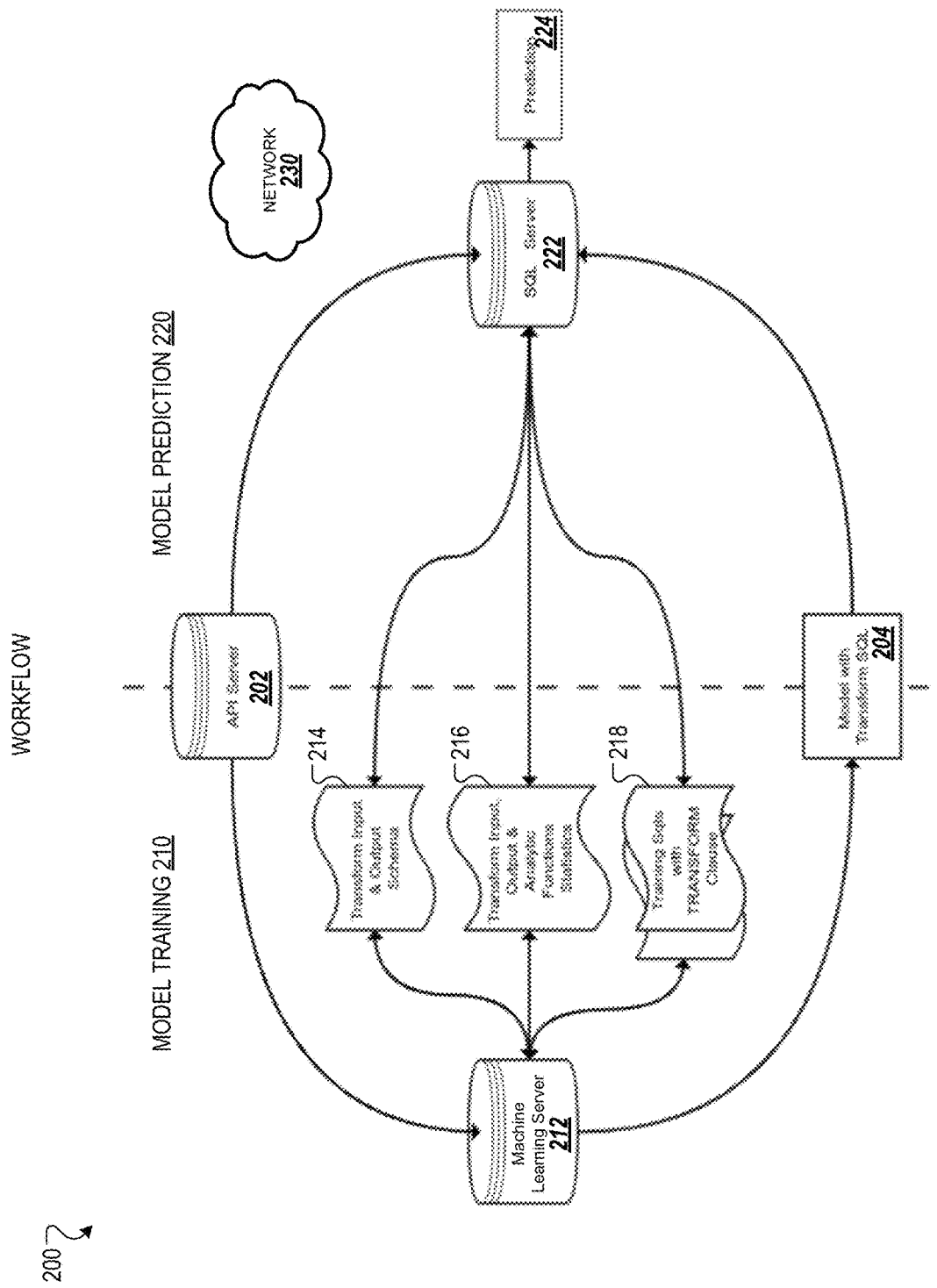
FIG. 2 is a diagram of an example system that performs transformation for machine learning pre-processing.

FIG. 2 is a diagram of an example system 200 that performs transformation for machine learning pre-processing. In some implementations, the system 200 is the system 100 described above with respect to FIG. 1.

The system 200 includes an API server 202, a machine learning (ML) server 212, and an SQL server 222. The API server 202, the ML server 212, and the SQL server 222 can each include one or more computing devices. The API server 202, the ML server 212, and the SQL server 222 can each include one or more data stores. The API server 202, the ML server 212, and the SQL server 222 can communicate over a network 230.

With respect to FIG. 1, the training environment 110 can be a part of the ML server 212. Similarly, the prediction environment 120 can be a part of the SQL server 222.

As shown, a model training 210 side of the system 200 is focused on training and generating the model 204, and includes the ML server 212. A model prediction 220 side of the system 200 is focused on leveraging the model 204 to produce a prediction 224, and includes the SQL server 222.

The ML server 212 can receive the instruction to create a model as shown in FIG. 1 from the first user device 112. Alternatively, the SQL server 222 can receive the instruction to create the model. In response, the SQL server 222 can generate a corresponding query of the queries 218 to send to the ML server 212. The ML server 212 can include the model generator 114. The ML server 212 can receive training data over the network 230. For example, the ML server 212 can receive and/or access the training data shown in FIG. 1 from the SQL server 222.

The ML server 212 can receive the queries 218 from the SQL server 222. Example queries are described in more detail above with respect FIG. 1. The queries 218 can each include a TRANSFORM clause. A query of the queries 218 can correspond to the instruction to create a model as shown in FIG. 1. Each of the queries of the queries 218 can identify training data or portions of training data (e.g., particular columns of the training data) that are to be used as input during the transform.

The ML server 212 and the SQL server 222 can be used to determine transform input and output schema 214. For example, the ML server 212 can analyze a query of the queries 218 to identify a TRANSFORM clause in the instruction. The ML server 212 can further identify one or more columns of the training data that are to be inputted when performing the transform and analyze those columns to determine the input schema. Similarly, the ML server 212 can use the TRANSFORM clause to identify one or more transform output columns and analyze those columns to determine the output schema.

The ML server 212 and the SQL server 222 can be used to determine transform input, transform output, analytic functions statistics 216. The ML server 212 can include the statistics 216 in a model 204. For example, the ML server 212 can analyze the input of one or more columns of the training data as indicated in a query of the queries 218 to determine statistics of the input. The ML server 212 can include these input statistics in the model 204.

The ML server 212 can use the queries 218, the input and output schema 214, and the statistics 216 to generate transformed training data. The ML server 212 can use the transformed training data in generating the model 204.

The SQL server 222 can receive the instruction to predict as shown in FIG. 1 from the second user device 122. The SQL server 222 can include the prediction engine 124. The SQL server 222 can receive and/or access the prediction data shown in FIG. 1.

The SQL server 222 can use the instruction to predict, the prediction data, and the model 204 to generate the prediction 224. Generating the prediction 224 can include the SQL server 222 accessing the statistics 216 and/or metadata in the model 204.

Figure 3:
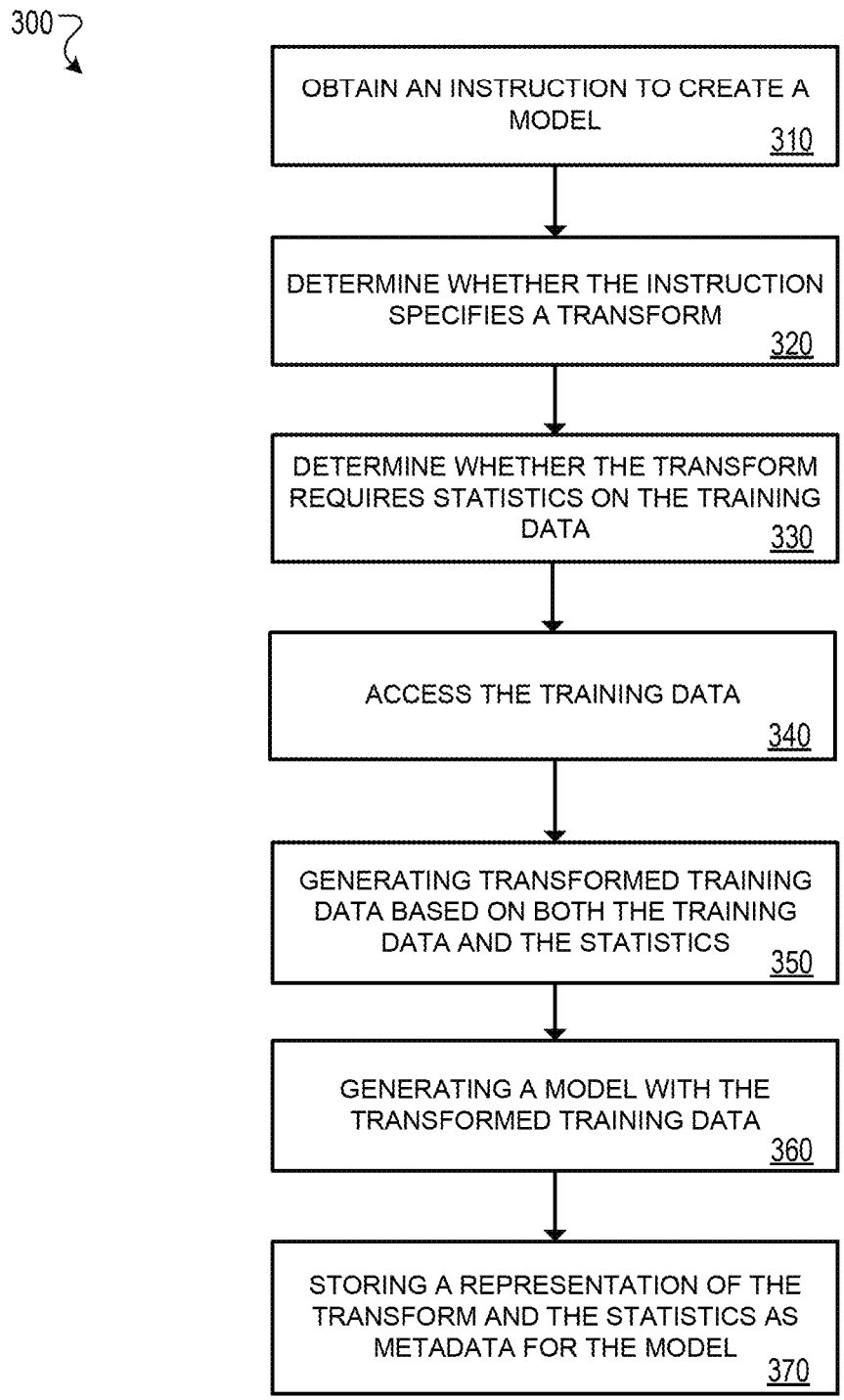
FIG. 3 is a flow diagram that illustrates an example of a process of transformation for machine learning pre-processing.

FIG. 3 is a flow diagram that illustrates an example of a process 300 of transformation for machine learning pre-processing. The process 300 can be performed by the system 100 shown in FIG. 1. The process 300 can be performed by the system 200 shown in FIG. 2. The process 300 may be performed by one or more computing devices, such as the computing device that executes the model generator 114 shown in FIG. 1 or the ML server 212 shown in FIG. 2.

The process 300 includes obtaining an instruction to create a model (310). For example, the model generator 114 may receive the SQL query "CREATE MODEL model_name TRANSFORM(ML.FEATURE_BUCKETIZE(f1, [2, 5, 10]) AS f1_bucketized, 1/f2 AS f2_inverse, f1, label) OPTIONS(type='linear_reg') AS SELECT f1, f2, label FROM input_table" from the first user device 112.

The process 300 includes determining whether the instruction specifies a transform (320). For example, the model generator 114 may determine that the instruction includes "TRANSFORM(" and, in response, determine that the instruction specifies a transform.

In some implementations, determining whether the instruction specifies a transform includes detecting the schemas of both input to the transform and output of the transform. The schemas can specify data types for feature values, whether a feature has to be present in all examples, allowed value ranges, and other properties. The schemas can be a type of protocol buffer. The schemas can be a collection of data base objects including, for example, tables, views, triggers, stored procedures, indexes, etc.

The schema of the input to the transform can include a schema corresponding to the training data or a portion of the training data, e.g., a schema of one or more input columns of the training data. The schema of the output of the transform can include the schema of the transformed training data, e.g., a schema of one or more output columns of the transformed training data.

In some implementations, determining whether the instruction specifies a transform includes detecting one or more analytic functions inside the transform. For example, the model generator 114 can determine that the transform includes the function ML.MIN_MAX_SCALER(f) OVER( ).

The process 300 includes determining whether the transform requires statistics on the training data (330). For example, the model generator 114 may determine that the function "FEATURE_BUCKETIZE" is within "TRANSFORM(" and ")," that the function is labeled as an aggregate function, and, in response, determine that the transform requires statistics on the training data.

In some implementations, the process 300 includes, in response to determining that the transform requires statistics on the training data, analyzing the training data to obtain the statistics. For example, the model generator 114 can analyze the training data or a portion of the training data indicated by the instruction to create the model to obtain the statistics. The model generator 114 can save the statistics as part of the model.

In some implementations, the training data includes data entries and analyzing the training data to obtain the statistics includes using all of the data entries to obtain the statistics. For example, the training data can be a table of data entries with each data entry of the data entries being represented as a row in the table. The table can include one or more data categories represented as one or more columns of the table.

With respect to FIG. 1, the model generator 114 can analyze all of the data entries to obtain the statistics. For example, the model generator 114 can take into account each entry of the data entries (e.g., each row) to obtain statistics on the data entries as a whole, to obtain statistics on one or more data categories of the data entries, etc. Specifically, if the model generator 114 determines that the instruction to create the model includes a transformation of min_max_scalar(data category 1), the model generator 114 can determine that it needs to analyze the first column of the training data to obtain the minimum value in the first column of the training data and to obtain the maximum value in the first column of the training data. The minimum and maximum values can be saved into the model as the statistics or as part of the statistics.

In some implementations, analyzing the training data to obtain the statistics comprises analyzing a portion of the training data identified by the instructions. The instruction to create the model can indicate a portion of the training data that is to be used for generating the model and/or that the transform is to be performed with. The model generator 114 can determine that the instruction indicates that only two data categories of the training data are to be used in generating the model. As discussed above and as will be discussed in more detail below, the model generator 114 can use this portion of the training data to obtain the statistics.

In some implementations, determining whether the transform requires statistics on the training data includes sending queries to compute the statistics of the data inputs to the transform, the data outputs of the transform, and/or the data inputs to one or more analytic functions in the transform or otherwise in the instruction. The data inputs can include all or part of the training data, e.g., data from one or more data categories of the training data. The data output of the transform can be all or part of the transformed training data. As an example, the model generator 114 can analyze the columns of the training data that are to be input to the transform and to an analytic function outside of the transform. The model generator 114 can proceed to also analyze the output columns of the transform. Analyzing the input columns of the training data can involve the model generator accessing all or part of the training data as described below.

In some implementations, the process 300 optionally includes expanding '*' related items in the transform to explicit aliases.

In some implementations, the process 300 optionally includes replacing analytic functions with their corresponding scalar functions. For example, the model generator 114 can replace the analytic function ML.MIN_MAX_SCALER (f) OVER( ) with the scalar function ML._MIN_MAX_SCALER(f, min, max), where ML._MIN_MAX_SCALER is the corresponding scalar function of the analytic function.

The process 300 includes accessing the training data (340). For example, the model generator 114 can access (e.g., import) the training data from a server or data store such as the machine learning server 212 or the SQL server 222 shown in FIG. 2.

In some implementations, accessing the training data includes accessing a portion of the training data. For example, the model generator 114 can access only the portion of the training data indicated in the instruction to create the model. Specifically, the instruction to create the model can indicate one or more data categories of the training data that are to be used for the transform and/or in generating the model. The model generator 114 can proceed to access a subset of the training data corresponding to the one or more data categories specified by the instruction.

In some implementations, accessing the training data includes receiving the training data or a portion of the training data. For example, the model generator 114 can be sent the training data from one or more external computing systems or devices, such as the first user device 112, the SQL server 222, etc.

The process 300 includes generating transformed training data from both the training data and the statistics (350). For example, the model generator 114 may generate transformed training data by bucketizing values for f1 in the training data and computing an inverse of values for f2 in the training data. The functions performed by the model generator 114 on all or a portion of the training data can include one or more following functions:

| Function | Platform | Proposed Function Options |
|---|---|---|
| *Numerical Feature Transformations* | | |
| Standardize (z score) | TF, sklearn, Spark ML | ml.standardize(col) OVER( ) |
| Bucketize | TF, Spark ML | ml.bucketize(col, num_buckets) OVER( ) ml.bucketize(col, array<splits>) |
| MinMax | TF, sklearn, Spark ML | ml.min_max(col) OVER( ) |
| PolynomialExpand | sklearn, Spark ML | ml.polynomial_expand(STRUCT(col_1, . . . , col_n)[, degree]) |
| *Categorical Feature Transformations* | | |
| TF-IDF | TF, sklearn, Spark ML | ml.tf_idf(col) OVER( ) |
| compute/apply_vocab | TF | ml.compute_and_apply_vocab(col) OVER( ) ml.apply_vocab(col, vocab_table) NOTE: vocab_table is a string-int map table |
| n-gram | TF, sklearn, Spark ML | ml.n_gram(col, n) OVER( ) |
| OneHotEncode | Sklearn, Spark ML | ml.one_hot_encode(col) OVER( ) |
| Word2Vec | Spark ML | ml.word2vec(col[, vocab_table]) OVER( ) NOTE: vocab_table is a string-vector map table |
| *Feature Filtering Transformations* | | |
| PCA | Sklearn, Spark ML | ml.pca(STRUCT(col_1, . . . , col_n)) OVER( ) |

In some implementations, generating the transformed training data from both the training data and the statistics includes performing one or more functions on the portion of the training data based on the transform. For example, the model generator 114 can generate transformed training data by bucketizing values for the data category f1 in the training data and computing an inverse of values for the data category f2 in the training data. The model generator 114 may not need to use other data categories of the training data to generate the transformed training data or to generate the model.

The process 300 includes generating a model with the transformed training data (360). For example, the model generator 114 may train a model using the transformed training data.

The process 300 includes storing a representation of the transform and the statistics as metadata for the model (370). For example, the model generator 114 may label the model with the string "TRANSFORM(ML.FEATURE_BUCKETIZE (f1, [2, 5, 10]) AS f1_bucketized, 1/f2 AS f2_inverse, f1, label)" to represent the transform and label the model with values that represent the boundaries of each bucket for the function "FEATURE_BUCKETIZE."

In some cases, the statistics can include at least one of a minimum value for a data category of the training data, or a maximum value for a data category of the training data; generating the transformed training data from both the training data and the statistics can include using at least one of the minimum value for the data category of the training data, or the maximum value for the data category of the training data in generating the transformed training data; and storing the representation of the transform and the statistics as metadata for the model can include storing at least one of the minimum value for the data category of the training data, or the maximum value for the data category of the training data.

For example, the model generator 114 can identify the function min_max_scalar(x) in the instruction as part of the transform. Here, x can represent the training data or a portion of the training data, e.g., a data category of the training data. The model generator 114 can analyze the training data corresponding to x to calculate a minimum and maximum of the training data corresponding to x, e.g., the portion of the training data found in an input column x. The model generator 114 can save the analysis results in the model, e.g., the model generator 114 can save the calculated minimum and maximum into the model. When generating the transformed training data, the model generator 114 can output $(x-\min(x))/(\max(x)-\min(x))$ for each data entry (e.g., each row) of the training data to produce a normalized result between the values [0, 1].

In some cases, the statistics includes a vocabulary generated from the training data; generating the transformed training data from both the training data and the statistics includes using the vocabulary in generating the transformed training data, and storing the representation of the transform and the statistics as metadata for the model includes storing the vocabulary.

For example, the model generator 114 can identify the function compute_apply_vocab(x) in the instruction as part of the transform. Here, x can represent the training data or a portion of the training data, e.g., a data category of the training data. The model generator 114 can analyze the training data corresponding to x to generates a vocabulary from the tokens (e.g., words) in x across all data entries of the training data (e.g., across all rows of the training data). The vocabulary itself can be a word to integer map or a word to vector map. The model generator 114 can save the analysis results in the model, e.g., the model generator 114 can save the materialized vocabulary table generated from the analysis in the model. When generating the transformed training data, the model generator 114 can output an integer that x maps to by averaging the integers each token (e.g., word) in this string maps to. The model generator 114 can produce an output for each data entry (e.g., each row) of the training data.

In some cases, generating the vocabulary from the training data includes tokenizing the training data to identify one or more words of the training data; and assigning the one or more words an identifier. For example, the model generator 114 can tokenize one or more data categories of the training data (e.g., one or more columns of the training data having string data) to identify multiple words. The model generator 114 can assign each of the identified words a particular number or vector. The words along with their corresponding numbers can make up a word to integer map. The words along with their corresponding vectors can make up a word to vector map. Storing the vocabulary can include storing the one or more words and their corresponding identifiers. For example, the model generator 114 can store the word to vector map and/or the word to integer map in the model.

In some cases, one or more functions in the transform do not require statistics. For these one or more functions, the model generator 114 does not need to analyze the training data or the corresponding portion of the training data. For example, the model generator 114 can identify the function polynomial_expand(f1, f2) in the transform and can determine that this function does not require an analysis of all or a portion of the training data. Accordingly, the model generator 114 will not perform an analysis for this function and no statistics corresponding to this function will be saved to the model. When generating the transformed training data, the model generator 114 can output STRUCT(f1, f1*f1, f1*f2, f2, f2*f2) for each data entry in the (e.g., each row) of the training data for this function.

In some cases, the instruction includes one or more functions outside of the transform. The one or more functions may or may not require analysis of all or of a portion of the training data. However, when the one or more functions are outside of the transform, any analysis performed for these functions and any resulting statistics obtained might optionally not be saved in the model. For example, the model generator 114 can identify a min_max_scalar(x) function outside of the transform and can analyze all or part of the training data to obtain statistics. The model generator 114 can proceed to perform the function but can choose not to save the corresponding statistics to the model. That is, the analysis will be calculated for the function and the transformation will be applied to the selected data but the analysis is neither saved nor exposed to the user in this example.

In some implementations, the process 300 optionally includes

In some implementations, the process 300 optionally includes all or a portion of the process 400 described in more detail below with respect to FIG. 4. For example, the process 300 optionally includes all of the process 400 described in more detail below with respect to FIG. 4.

Figure 4:
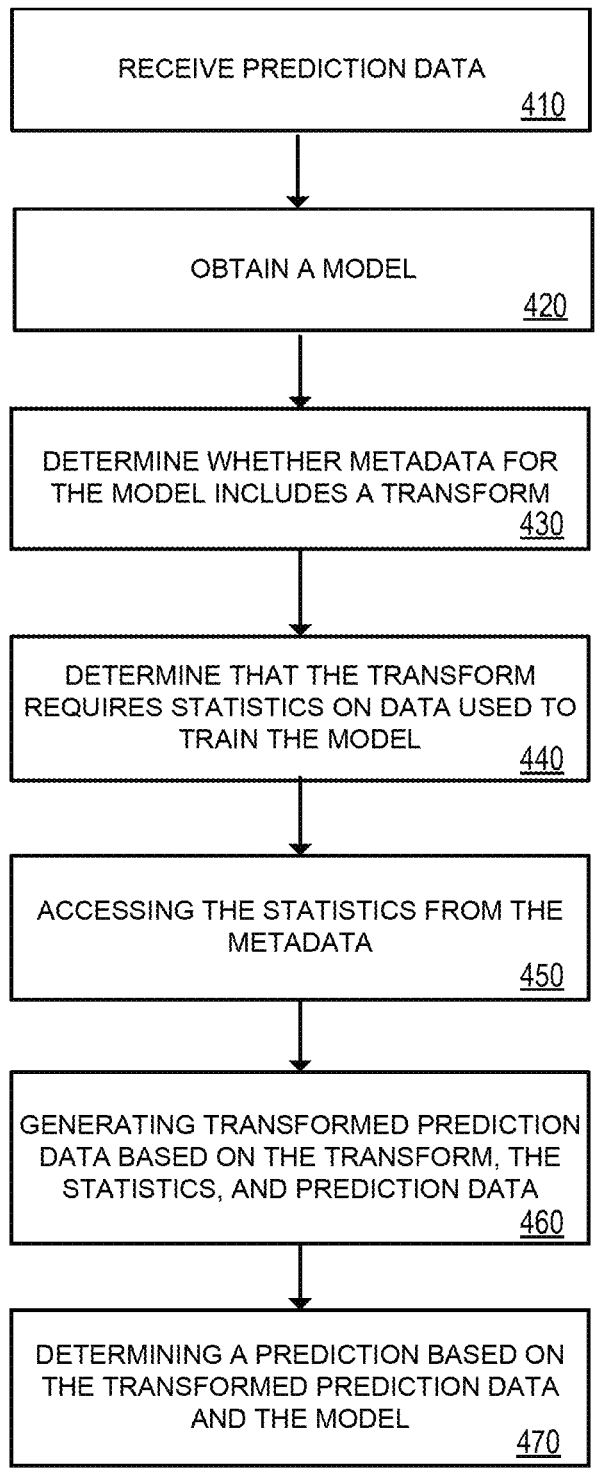
FIG. 4 is a flow diagram that illustrates example of another process of using a model generated from a transformation for machine learning pre-processing.

FIG. 4 is a flow diagram that illustrates example of another process 400 of using a model generated from a transformation for machine learning pre-processing. The process 400 can be performed by the system 100 shown in FIG. 1. The process 400 can be performed by the system 200 shown in FIG. 2. The process 400 may be performed by one or more computing devices, such as the computing device that executes the prediction engine 124 shown in FIG. 1 or the SQL server 222 shown in FIG. 2.

The process 400 includes obtaining a model (410). For example, the prediction engine 124 may receive the model from the model generator 114.

The process 400 includes determining whether metadata for the model includes a transform (420). For example, the prediction engine 124 may determine that the model is labeled with a string "TRANSFORM(ML.FEATURE_BUCKETIZE (f1, [2, 5, 10]) AS f1_bucketized, 1/f2 AS f2_inverse, f1, label)" that includes "TRANSFORM("and, in response, determine that the model includes a transform."

The process 400 includes determining whether the transform requires statistics on the training data (430). For example, the prediction engine 124 may parse the string and determine that the transform includes the function "FEATURE_BUCKETIZE" which requires information that indicates the ranges of each bucket based on the training data.

The process 400 includes generating transformed prediction data based on the transform, the statistics, and the prediction data (440). For example, the prediction engine 124 may obtain information that specifies the ranges of each bucket from metadata for the model also received with the model, transform a first column of the prediction data using the ranges of each bucket, and transform a second column of the prediction data by inversing each value of the second column.

The process 400 includes determining a prediction based on the transformed prediction data and the model (450). For example, the prediction engine 124 may provide rows of the transformed prediction data as input into the model and receive a prediction for each row from the model as an output.

Figure 5:
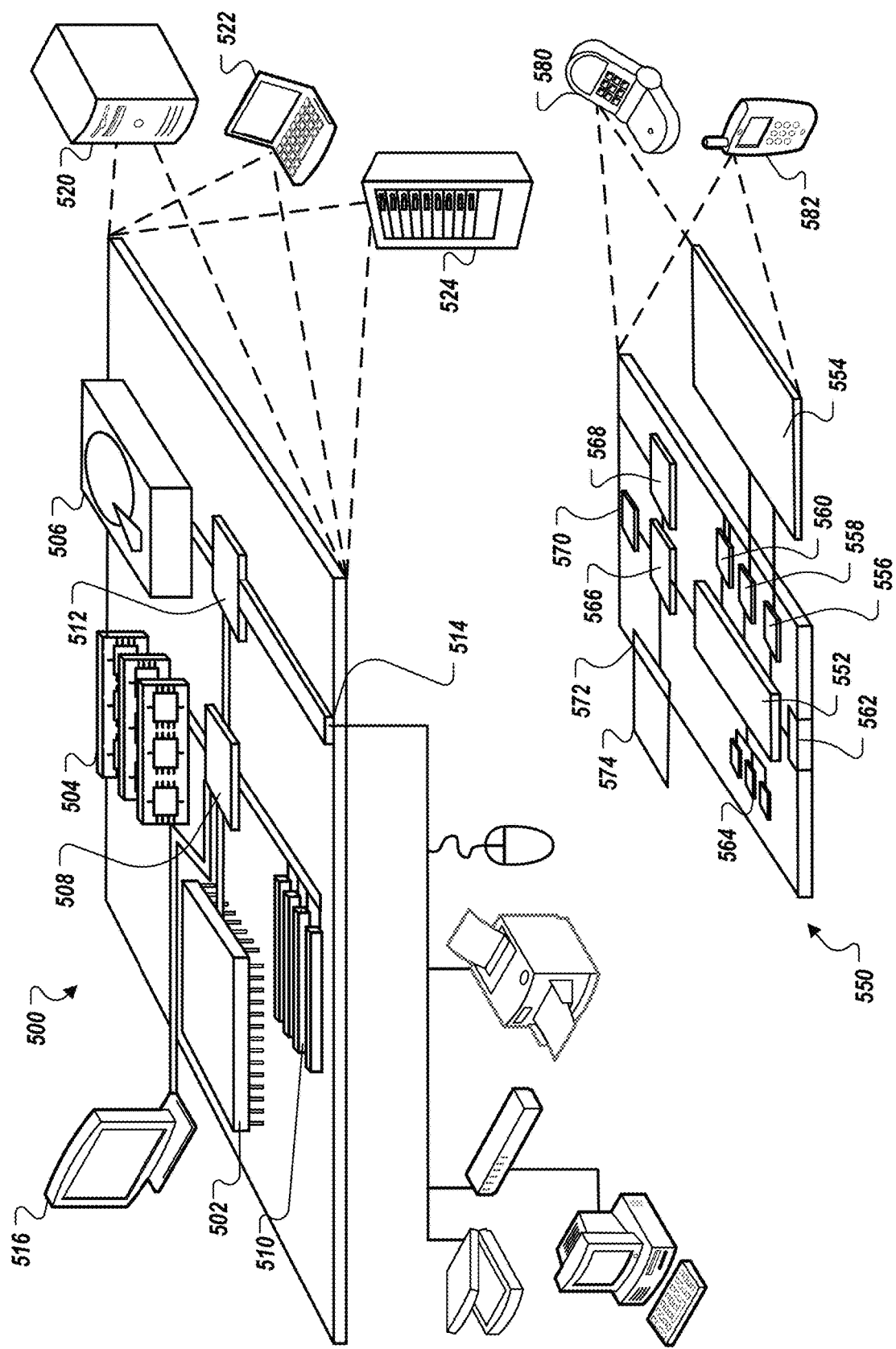
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 510 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580.

It may also be implemented as part of a smartphone 582, personal digital assistant, or other similar mobile device.

Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for machine learning preprocessing, the method comprising:
   obtaining, with one or more processors, an instruction to generate a model using training data;
   determining, with the one or more processors, the instruction includes a clause specifying to perform a transform of the training data;
   identifying, with the one or more processors, one or more aggregate functions included in the clause that require statistics on the training data;
   accessing, with the one or more processors, the training data;
   generating, with the one or more processors, the statistics on the training data based on the one or more aggregate functions;
   converting, with the one or more processors, the one or more aggregate functions to one or more scalar functions using the statistics;
   transforming, with the one or more processors, the training data with the one or more scalar functions to generate transformed training data;
   generating, with the one or more processors, the model using the transformed training data;
   generating, with the one or more processors, a prediction based on prediction data using the model; and
   outputting, with the one or more processors, the prediction.

2. The method of claim 1, wherein:
   the training data includes data entries; and
   generating the statistics on the training data comprises using all of the data entries.

3. The method of claim 1, wherein:
   the training data includes data entries; and
   generating the statistics on the training data comprises using a portion of the training data.

4. The method of claim 1, wherein transforming the training data to generate the transformed training data comprises performing the one or more scalar functions on the training data.

5. The method of claim 4, wherein the one or more aggregate functions are converted to the one or more scalar functions prior to performing the one or more scalar functions on the training data.

6. The method of claim 1, wherein:
   the instruction indicates a portion of the training data; and
   accessing the training data comprises accessing the portion of the training data.

7. The method of claim 1, wherein obtaining the instruction to generate a model comprises obtaining a SQL query that contains the instruction.

8. The method of claim 1, wherein generating the prediction further comprises:

storing, by the one or more processors, a representation of the transform and the statistics as metadata for the model;
receiving, with the one or more processors, the prediction data;
obtaining, with the one or more processors, the model;
determining, with the one or more processors, the metadata for the model includes the representation of the transform;
generating, with the one or more processors, transformed prediction data from the prediction data using the transform; and
generating, with the one or more processors, the prediction from the transformed prediction data using the model.

9. A system comprising:
one or more processors; and
one or more storage devices coupled to the one or more processors and storing instructions that, when executed by the one or more processors, cause the one or more processors to perform operations for machine learning preprocessing, the operations comprising:
   obtaining an instruction to generate a model using training data;
   determining the instruction includes a clause specifying to perform a transform of the training data;
   identifying one or more aggregate functions included in the clause that require statistics on the training data;
   accessing the training data;
   generating the statistics from the training data based on the one or more aggregate functions;
   converting the one or more aggregate functions to one or more scalar functions using the statistics;
   transforming the training data with the one or more scalar functions to generate transformed training data;
   generating the model using the transformed training data;
   generating a prediction based on prediction data using the model; and
   outputting the prediction.

10. The system of claim 9, wherein:
the training data includes data entries; and
generating the statistics on the training data comprises using all of the data entries.

11. The system of claim 9, wherein:
the training data includes data entries; and
generating the statistics on the training data comprises using a portion of the training data.

12. The system of claim 9, wherein transforming the training data to generate the transformed training data comprises performing the one or more scalar functions on the training data.

13. The system of claim 12, wherein the one or more aggregate functions are converted to the one or more scalar functions prior to performing the one or more scalar functions on the training data.

14. The system of claim 9, wherein:
the instruction indicates a portion of the training data; and
accessing the training data comprises accessing the portion of the training data.

15. The system of claim 9, wherein generating the prediction further comprises:
   storing a representation of the transform and the statistics as metadata for the model;
   receiving the prediction data;
   obtaining the model;
   determining the metadata for the model includes the representation of the transform;
   generating transformed prediction data from the prediction data using the transform; and
   generating the prediction from the transformed prediction data using the model.

16. One or more non-transitory computer-readable media for storing instructions that, when executed by one or more processors, cause the one or more processors to perform operations for machine learning preprocessing, the operations comprising:
   obtaining an instruction to generate a model using training data;
   determining the instruction includes a clause specifying to perform a transform of the training data;
   identifying one or more aggregate functions included in the clause that require statistics on the training data;
   accessing the training data;
   generating the statistics on the training data based on the one or more aggregate functions;
   converting the one or more aggregate functions to one or more scalar functions using the statistics;
   transforming the training data with the one or more scalar functions to generate transformed training data;
   generating the model using the transformed training data;
   generating a prediction based on prediction data using the model; and
   outputting the prediction.

17. The computer-readable media of claim 16, wherein transforming the training data to generate the transformed training data comprises performing the one or more scalar functions on the training data.

* * * * *